United States Patent
Yoon et al.

(10) Patent No.: US 9,570,749 B2
(45) Date of Patent: Feb. 14, 2017

(54) NEGATIVE ELECTRODE, LITHIUM BATTERY INCLUDING THE SAME AND METHOD OF MANUFACTURING LITHIUM BATTERY

(71) Applicant: SAMSUNG SDI CO., LTD., Yongin-si, Gyeonggi-do (KR)

(72) Inventors: Duk-Hyoung Yoon, Yongin-si (KR); So-Ra Lee, Yongin-si (KR); Hye-Ri Eom, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 139 days.

(21) Appl. No.: 14/643,235

(22) Filed: Mar. 10, 2015

(65) Prior Publication Data
US 2015/0325843 A1    Nov. 12, 2015

(30) Foreign Application Priority Data

May 9, 2014    (KR) ........................ 10-2014-0055739

(51) Int. Cl.

| | |
|---|---|
| *H01M 4/62* | (2006.01) |
| *H01M 4/38* | (2006.01) |
| *H01M 4/485* | (2010.01) |
| *H01M 4/36* | (2006.01) |
| *H01M 10/052* | (2010.01) |
| *H01M 10/058* | (2010.01) |
| *H01M 4/04* | (2006.01) |
| *H01M 4/1395* | (2010.01) |
| *H01M 10/44* | (2006.01) |
| *H02J 7/00* | (2006.01) |

(Continued)

(52) U.S. Cl.
CPC ............. *H01M 4/62* (2013.01); *H01M 4/0404* (2013.01); *H01M 4/134* (2013.01); *H01M 4/1395* (2013.01); *H01M 4/364* (2013.01); *H01M 4/366* (2013.01); *H01M 4/38* (2013.01); *H01M 4/386* (2013.01); *H01M 4/387* (2013.01); *H01M 4/485* (2013.01); *H01M 4/624* (2013.01); *H01M 10/052* (2013.01); *H01M 10/058* (2013.01); *H01M 10/44* (2013.01); *H02J 7/00* (2013.01); *H02J 7/0052* (2013.01); *H01M 4/625* (2013.01); *H01M 2004/027* (2013.01); *H01M 2300/004* (2013.01); *Y02E 60/122* (2013.01); *Y10T 29/49117* (2015.01)

(58) Field of Classification Search
None
See application file for complete search history.

(56) References Cited

U.S. PATENT DOCUMENTS

| | | |
|---|---|---|
| 2013/0059203 A1 | 3/2013 | Hong et al. |
| 2013/0143119 A1 | 6/2013 | Mah et al. |
| 2013/0184385 A1 | 7/2013 | Ogihara |

FOREIGN PATENT DOCUMENTS

| | | |
|---|---|---|
| KR | 10-2011-0124728 A | 11/2011 |
| KR | 10-2013-0052605 A | 5/2013 |
| KR | 10-2013-0062105 A | 6/2013 |

*Primary Examiner* — Patrick Ryan
*Assistant Examiner* — Wyatt McConnell
(74) *Attorney, Agent, or Firm* — Lee & Morse, P.C.

(57) ABSTRACT

A negative electrode includes a current collector; and a negative active material layer on at least a surface of the current collector. The negative active material layer includes a porous matrix including lithium titanium oxide particles and metal nanoparticles that are alloyable with lithium. An average particle diameter of the lithium titanium oxide particles is at least two times greater than an average particle diameter of the metal nanoparticles.

20 Claims, 6 Drawing Sheets

NEGATIVE ELECTRODE, LITHIUM BATTERY INCLUDING THE SAME AND METHOD OF MANUFACTURING LITHIUM BATTERY

CROSS-REFERENCE TO RELATED APPLICATION

Korean Patent Application No. 10-2014-0055739, filed on May 9, 2014, in the Korean Intellectual Property Office, and entitled: "Negative Electrode, Lithium Battery Including the Same and Method of Manufacturing Lithium Battery," is incorporated by reference herein in its entirety.

BACKGROUND

1. Field

One or more embodiments relate to a negative electrode, a lithium battery including the same, and a method of manufacturing the lithium battery.

2. Description of the Related Art

Lithium batteries may produce electric energy due to oxidation and reduction reactions that may occur when lithium ions are intercalated to or deintercalated from a positive electrode and a negative electrode, each including an active material that enables the intercalation and deintercalation of lithium ions, with an organic electrolytic solution or a polymer electrolytic solution filling therebetween.

SUMMARY

Embodiments are directed to a negative electrode for a lithium battery, the negative electrode including a current collector; and a negative active material layer on at least a surface of the current collector. The negative active material layer includes a porous matrix including lithium titanium oxide particles and metal nanoparticles that are alloyable with lithium. An average particle diameter of the lithium titanium oxide particles is at least two times greater than an average particle diameter of the metal nanoparticles.

The average particle diameter of the lithium titanium oxide particles may be 5 to 50 times greater than the average particle diameter of the metal nanoparticles.

The metal nanoparticles may be located among the lithium titanium oxide particles.

The average particle diameter of the lithium titanium oxide particles may be in a range of about 100 nm to about 1 μm.

The lithium titanium oxide particles may include a compound represented by Formula 1:

$$Li_{x+3}Ti_yO_{12} \qquad \text{<Formula 1>}$$

wherein 2.4≤x≤4.2, and 4.8<y≤6.6.

An amount of the lithium titanium oxide particles may be 3 to 10 times greater than that of the metal nanoparticles by weight.

The average particle diameter of the metal nanoparticles may be in a range of about 10 nm to about 500 nm.

The metal nanoparticles may include one or more selected from Si, Sn, Al, Ge, Pb, Bi, Sb, and an alloy or oxide thereof.

The metal nanoparticles may include Si or $SiO_x$ (0<x<2).

The metal nanoparticles may include metal particles coated with a carbonaceous coating layer.

An amount of the metal nanoparticles may be in a range of about 0.1 wt % to about 50 wt % based on the total weight of the negative active material layer.

The lithium titanium oxide particles may not deintercalate lithium ions during charging and discharging of a lithium battery.

The lithium titanium oxide particles may have electric conductivity.

The negative active material layer may further include a conductive material.

A lithium battery may include the presently disclosed negative electrode.

Embodiments are directed to a method of manufacturing a lithium battery, the method including providing a lithium battery assembly including a positive electrode, a negative electrode, a separator disposed between the positive electrode and the negative electrode, and an electrolyte. Providing the lithium battery assembly includes preparing a negative active material composition including metal nanoparticles and lithium titanium oxide particles; and coating a current collector with the negative active material composition to manufacture a negative electrode including a negative active material layer formed on the current collector. The method of manufacturing the lithium battery further includes charging and discharging the lithium battery assembly. Discharging the lithium battery assembly is performed at 1.5 V or less.

The lithium titanium oxide particles of the negative active material composition may include a compound represented by Formula 2:

$$Li_xTi_yO_2 \qquad \text{<Formula 2>}$$

wherein 2.4≤x≤4.2, and 4.8<y≤6.6.

During discharging the lithium battery assembly, the lithium titanium oxide particles may include a compound represented by Formula 1:

$$Li_{x+3}Ti_yO_{12} \qquad \text{<Formula 1>}$$

wherein 2.4≤x≤4.2, and 4.8<y≤6.6.

The lithium titanium oxide particles of the lithium battery subjected to the discharging of the lithium battery assembly may not deintercalate lithium ions.

A method of using a lithium battery may include discharging the presently disclosed lithium battery at a voltage of 1.5 V or less.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

A negative electrode for a lithium battery according to an embodiment may include a current collector; and a negative active material layer disposed on at least a surface of the current collector, and the negative active material layer may include a porous matrix including lithium titanium oxide particles and metal nanoparticles that are alloyable with lithium, and an average diameter of the lithium titanium oxide particles may be at least two times greater than the average particle diameter of the metal nanoparticles.

During charging of a battery, the metal nanoparticles may intercalate lithium ions to form an alloy, and the lattice constant and volume of the metal nanoparticles intercalated with lithium ions may increase. During discharging of a battery, the metal nanoparticles may deintercalate lithium ions, may return to their original state, and may lead to a decrease in their lattice constants and volumes.

However, lithium titanium oxide (LTO) is known as a zero-strain lithium insertion material that may not undergo a crystalline lattice constant change during intercalation and deintercalation of lithium ions. Unlike the metal nanoparticles, the lithium titanium oxide particles may undergo a very small volumetric change during charging and discharging. $Li_4Ti_5O_{12}$, which is a lithium titanium oxide, has the following lithium ion intercalation reaction:

<Reaction Scheme 1>

$$Li_4Ti_5O_{12} + 3Li^+ + 3e^- \longrightarrow Li_7Ti_5O_{12}.$$

According to an embodiment, the metal nanoparticles may be located among lithium titanium oxide particles, e.g., in pores present among, titanium oxide particles.

Figure 1:
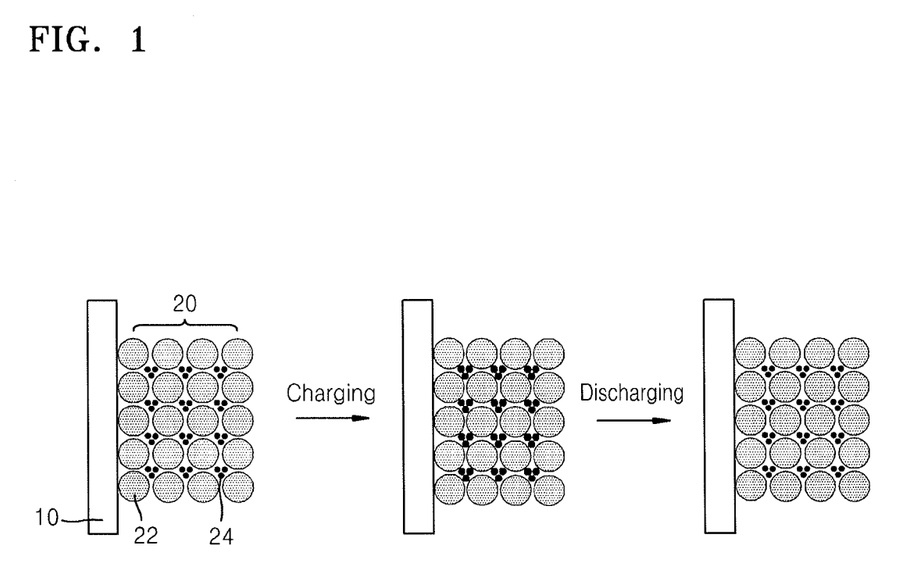
FIG. 1 illustrates structural changes of a negative electrode according to an embodiment during charging and discharging of a battery.

For example, FIG. 1 shows structural changes of a negative electrode according to an embodiment during charging and discharging of a battery. Referring to the left hand side drawing of FIG. 1, a negative active material layer 20 including lithium titanium oxide particles 22 and metal nanoparticles 24 may be disposed on a surface of a current collector 10. The lithium titanium oxide particles 22 may form a porous matrix, and the metal nanoparticles 24 may be located in pores present among the lithium titanium oxide particles.

A battery including the negative electrode may be initially charged, for example, at a voltage within a range of about 0.4 V to about 0.6 V, the metal nanoparticles 24 may intercalate lithium ions, and at a voltage of about 1.8 V. The lithium titanium oxide particles 22 may intercalate lithium ions. After the charging, as illustrated in the middle drawing of FIG. 1, there may not be a change in volume of lithium titanium oxide particles 22 that have no crystalline lattice constant change. However, the volume of the metal nanoparticles 24 may expand during charging. The expansion of the metal nanoparticles 24 may be suppressed by the porous matrix of lithium titanium oxide particles 22 surrounding the metal nanoparticles 24.

Thereafter, as illustrated in the right-hand side drawing of FIG. 1, the battery including the negative electrode may be discharged, the metal nanoparticles 24 may deintercalate lithium ions, and may return to their original sizes.

According to an embodiment, the lithium titanium oxide particles 22 may act as an inactive material that does not intercalate or deintercalate lithium ions during charging and discharging of a lithium battery. The lithium titanium oxide particles 22 may intercalate lithium ions during initial charging, may retain a state intercalated with lithium ions, and may not intercalate or deintercalate lithium ions, for example, under repeated charging and discharging of the lithium battery.

According to an embodiment, a battery including the negative electrode may be discharged, and a discharge cut-off voltage may be set in such a manner that the lithium titanium oxide particles 22 do not deintercalate lithium ions. A battery including the negative electrode may be discharged, and the metal nanoparticles 24 may deintercalate lithium ions, while the lithium titanium oxide particles 22 may not deintercalate lithium ions that have intercalated thereinto during charging, for example, initial charging.

The porous matrix including the lithium titanium oxide particles 22 may act as a body that does not involve chemical reactions of a battery and may suppress volumetric expansion of the metal nanoparticles 24.

Furthermore, the lithium titanium oxide particles 22 may have electric conductivity. The lithium titanium oxide particles 22 may have lithium ions intercalated thereinto, and the lithium titanium oxide particles 22 may additionally act as a conductive material. For example, after an initial charging and discharging, the resistance of the battery may be lower than that of a battery that is not subjected to charging and discharging, due to electric conductivity of the lithium titanium oxide particles 22. Also, compared to a case in which the lithium titanium oxide particles 22 act as an active material, a battery including the negative electrode may have a low resistance because the discharge cut-off voltage may be set in such a manner that the lithium titanium oxide particles 22 deintercalate lithium ions. The negative active material layer 20 may not include a separate conductive material in addition to the lithium titanium oxide particles 22.

In an embodiment, the metal nanoparticles 24 may not be coated with the lithium titanium oxide particles 22. The lithium titanium oxide particles 22 may form a matrix that may endure stress caused by volumetric expansion of the metal nanoparticles 24. An additional coating process for coating of the metal nanoparticles may be omitted. For example, the lithium titanium oxide particles 22 and the metal nanoparticles 24, which have the average diameters described above, may be blended to embody the structure illustrated in FIG. 1. The decrease in volumetric expansion suppression effects due to exfoliation of a coating layer or the increase in irreversible capacity due to the existence of a coating layer may be prevented.

According to an embodiment, an average diameter of the lithium titanium oxide particles 22 may be about 5 to about 50 times greater than an average diameter of the metal nanoparticles 24. For example, an average diameter of the lithium titanium oxide particles 22 may be about 7 to about 50 times greater than an average diameter of the metal nanoparticles 24. For example, an average diameter of the lithium titanium oxide particles 22 may be about 10 to about 50 times greater than an average diameter of the metal nanoparticles 24. For example, an average diameter of the lithium titanium oxide particles 22 may be about 10 to about 30 times greater than an average diameter of the metal nanoparticles 24. For example, an average diameter of the lithium titanium oxide particles 22 may be about 10 to about 20 times greater than an average diameter of the metal nanoparticles 24. Maintaining an average diameter of the lithium titanium oxide particles within these ranges may help provide a sufficient number of pores among the lithium titanium oxide particles 22, and the metal nanoparticles 24 may be located in the pores.

For example, the average diameter of the lithium titanium oxide particles 22 and the average particle diameter of the metal nanoparticles 24 may each be denoted by D50, which is a particle diameter at 50% in a cumulative distribution curve from the smallest particle diameter to the largest particle diameter, when the total number of particles is defined as 100%. D50 may be measured, for example, by using a particle diameter analyzer, transmission electron microscopy (TEM), or SEM pictures. In other embodiments, particle diameters may be measured by using a measurement device using dynamic light-scattering, data analysis may be performed to count the number of particles belonging to each particle size range, and calculations may be performed using the numbers to obtain an average particle size.

According to an embodiment, the average particle diameter of the lithium titanium oxide particles 22 may be in a range of about 100 nm to about 1 μm. For example, the average particle diameter of the lithium titanium oxide particles 22 may be in a range of about 100 nm to about 700 nm. For example, the average particle diameter of the lithium titanium oxide particles 22 may be in a range of about 100 nm to about 500 nm. For example, the average particle diameter of the lithium titanium oxide particles 22 may be in a range of about 100 nm to about 300 nm. Maintaining an average diameter of the lithium titanium oxide particles within these ranges may help provide the porous matrix including the lithium titanium oxide particles 22 with a mechanical strength that is sufficient to endure stress that may be caused by volumetric expansion of the metal nanoparticles 24.

According to an embodiment, the lithium titanium oxide particles 22 may include a compound represented by Formula 1 below:

<Formula 1> wherein 2.4≤x≤4.2, and 4.8<y≤6.6.

For example, the lithium titanium oxide particles 22 may be $Li_4Ti_5O_{12}$. The lithium titanium oxide particles 22 may exist in the form of $Li_7Ti_5O_{12}$ produced according to Formula 1 above in which lithium ions are intercalated after the initial first charging, and thus, may not intercalate or deintercalate lithium ions any longer.

According to an embodiment, an amount of the lithium titanium oxide particles 22 may be about 3 to about 10 times greater than that of the metal nanoparticles 24 by weight. For example, an amount of the lithium titanium oxide particles 22 may be about 3 to about 8 times greater than that of the metal nanoparticles 24 by weight. For example, an amount of the lithium titanium oxide particles 22 may be about 4 to about 7 times greater than that of the metal nanoparticles 24 by weight. Maintaining an amount of the lithium titanium oxide particles within these ranges may help the lithium titanium oxide particles 22 to effectively form a matrix that may suppress volumetric expansion of the metal nanoparticles 24, and lithium storage capacity of the negative electrode may not decrease.

According to an embodiment, the average particle diameter of the metal nanoparticles 24 may be in a range of about 10 nm to about 500 nm. For example, the average particle diameter of the metal nanoparticles 24 may be in a range of about 10 nm to about 200 nm. For example, the average particle diameter of the metal nanoparticles 24 may be in a range of about 10 nm to about 100 nm. Maintaining the average particle diameter of the metal nanoparticles within these ranges may help the metal nanoparticles 24 uniformly disperse in pores inside the porous matrix, volumetric expansion of the metal nanoparticles 24 during charging and discharging may be efficiently suppressed by the lithium titanium oxide particles 22 surrounding the metal nanoparticles 24, and destruction of the metal nanoparticles 24 may be prevented.

According to an embodiment, the metal nanoparticles 24 may include one or more selected from silicon (Si), Tin (Sn), aluminum (Al), gallium (Ge), lead (Pb), bismuth (Bi), antimony (Sb), and an alloy or oxide thereof.

For example, the metal nanoparticles 24 may include Si.

Herein, for purposes of defining a metal nanoparticle, a nanoparticle including or made up entirely of silicon, which has a maximum theoretical capacity of about 4020 mAh/g and thereby may exhibit high capacity, may be considered as a metal nanoparticle. Thus, for example, the metal nanoparticle may be an Si nanoparticle.

For example, the metal nanoparticles 24 may include a Si—Y alloy (Y is an alkali metal, alkali earth metal, a Group 13 element, a Group 14 element, transition metal, a rare-earth element or a combination thereof, and is not Si), or a Sn—Y alloy (Y is an alkali metal, alkali earth metal, a Group 13 element, a Group 14 element, transition metal, a rare-earth element, or a combination thereof, and is not Sn). The element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

For example, the metal nanoparticles 24 may include an oxide, such as $SnO_2$ or $SiO_x$ (0<x<2).

According to an embodiment, the metal nanoparticles 24 may be metal nanoparticles coated with a carbonaceous coating layer.

For example, the metal nanoparticles 24 may be coated with a carbonaceous material. The carbonaceous material may include amorphous carbon. The amorphous carbon may be selected from soft carbon, hard carbon, mesophase pitch carbide, calcined corks, nano carbon fiber, and a mixture thereof.

A coating method for the formation of the carbonaceous coating layer may be, for example, a dry coating method or a liquid coating method. For example, the dry coating may be chemical vapor deposition (CVD) or deposition, and the liquid coating may be immersing or spraying. Liquid coating may be used, and DMSO or THF may be used as a solvent.

According to an embodiment, the amount of the metal nanoparticles 24 may be about 0.1 wt % to about 50 wt % based on the total weight of the negative active material layer 20. For example, the amount of the metal nanoparticles 24 may be about 1 wt % to about 30 wt % based on the total weight of the negative active material layer 20. For example, the amount of the metal nanoparticles 24 may be about 10 wt % to about 20 wt % based on the total weight of the negative active material layer 20. Maintaining the amount of the metal nanoparticles within these ranges may help a negative electrode retain its structural stability, and a battery with high capacity may be obtained.

According to an embodiment, the negative active material layer 20 may further include a carbonaceous material that intercalates or deintercalates lithium ions.

For example, the carbonaceous material may be a crystalline carbon, an amorphous carbon, or a mixture thereof. For example, the crystalline carbon may be natural or artificial graphite that is non-shaped, tabular, flake, spherical, or fibrous, and the amorphous carbon may be soft carbon or hard carbon, meso-phase pitch carbide, or calcined cork.

The negative active material layer 20 may further include the carbonaceous material, and the metal nanoparticles 24 may be present among the lithium titanium oxide particles 22.

For example, particles of the carbonaceous material may have a greater diameter than the lithium titanium oxide particles 22, or may have a tabular or spherical structure, and the porous matrix including the lithium titanium oxide particles 22 may be present between the carbonaceous material particles, and the metal nanoparticles 24 may exist within pores of the porous matrix.

According to an embodiment, the amount of the carbonaceous material may be about 10 wt % to about 90 wt % based on the total weight of the negative active material layer 20. Maintaining the amount of the carbonaceous material within these ranges may help provide a negative electrode with improved structural stability.

According to an embodiment, the negative active material layer 20 may further include a binder. The binder may be an aqueous binder. For example, the binder may aid binding of the metal nanoparticles 24 and a current collector, binding of the lithium titanium oxide particles 22 and a current collector, or binding of the metal nanoparticles 24 and a conductive material. The binder may be selected from, for example, polyvinylidenefluoride (PVdF), polyvinylidenechloride, polybenzimidazole, polyimide, polyvinylacetate, polyacrylonitrile, polyvinylalcohol, carboxymethylcellulose (CMC), starch, hydroxypropylcellulose, regenerated cellulose, polyvinylpyrrolidone, tetrafluoroethylene, polyethylene, polypropylene, polystyrene, polymethylmethacrylate, polyaniline, acrylonitrilebutadienestyrene, phenol resin, epoxy resin, polyethyleneterephthalate, polytetrafluoroethylene, polyphenylsulfide, polyamideimide, polyetherimide, polyethylenesulfone, polyamide, polyacetal, polyphenyleneoxide, polybutyleneterephthalate, ethylene-propylene-diene monomer (EPDM), sulfonated EPDM, styrene butadiene rubber (SBR), fluorine rubber, and a combination thereof. An amount of the binder may be, based on 100 parts by weight of the sum of the metal nanoparticles 24 and the carbonaceous material which may act as a negative active material, in a range of about 1 to about 50 parts by weight, for example, about 1 to about 30 parts by weight, about 1 to about 20 parts by weight, or about 1 to about 15 parts by weight.

According to an embodiment, the negative active material layer 20 may further include a conductive material. The conductive material may provide a conductive passage to the metal nanoparticles 24 to improve electric conductivity. The conductive material may be any one of various materials that are used in lithium batteries, and may be, for example, a carbonaceous material, such as carbon black, acetylene black, ketjen black, or carbon fiber; a metallic material, such as a powder or fiber of metal, such as copper, nickel, aluminum, or silver; a conductive polymer, such as a polyphenylene derivative; or a mixture thereof. An amount of the conductive material may be appropriately adjusted for use. For example, a weight ratio of the metal nanoparticles 24 to the conductive material may be in a range of 99:1 to 90:10.

The current collector may not be particularly restricted as long as it does not cause chemical changes in a corresponding battery and has high conductivity. For example the current collector may include at least one material selected from aluminum, copper, nickel, titanium, and stainless steel. The material, such as aluminum, copper, nickel, or stainless steel, may be surface-treated by electroplating or ion deposition using a coating component, such as nickel, copper, aluminum, titanium, gold, silver, platinum, or palladium, or the surface of the material may be coated with nanoparticles of the coating component by dipping or pressing. In some embodiments, the current collector may include a base formed of a non-conductive material and coated with a conductive material as described above.

The current collector may have a surface having a fine uneven structure, and the fine uneven structure may contribute to an increase in adhesiveness to an active material layer that is used to coat a substrate. The current collector may be formed as, for example, a film, a sheet, a foil, a net, a porous structure, a foam, or a non-woven fabric. A thickness of the current collector may be in a range of about 3 μm to about 500 μm.

A lithium battery according an embodiment includes the negative electrode.

Hereinafter, a method of manufacturing a lithium battery according to an embodiment will be described in detail.

A method of manufacturing a lithium battery according to an embodiment may include providing a lithium battery assembly including a positive electrode, a negative electrode, a separator disposed between the positive electrode and the negative electrode, and an electrolyte; charging and discharging the lithium battery assembly to manufacture the lithium battery. Providing of the lithium battery assembly may include preparing a negative active material composition including metal nanoparticles and lithium titanium oxide particles; and coating a current collector with the negative active material composition to manufacture a negative electrode including a negative active material layer formed on the current collector. Discharging the lithium battery assembly may be performed at discharge cut-off voltage of 1.5 V or less.

Preparing of the lithium battery assembly including a positive electrode, a negative electrode, a separator disposed between the positive electrode and the negative electrode, and an electrolyte will be described in detail.

An example of a method of manufacturing the negative electrode is described below.

Metal nanoparticles, lithium titanium oxide particles, and optionally, a carbonaceous material, a binder, and a conductive material may be dispersed in a solvent to prepare a negative active material composition.

Then, a current collector may be coated with the negative active material composition, and for the coating, a current collector may be directly coated with the negative active material composition, or a separate support may be coated with the negative active material composition, and then, a current collector may be laminated with a negative active material film exfoliated from the support.

Then, the current collector coated with the negative active material composition may be dried and pressed to prepare a negative electrode including the negative active material layer formed on the current collector.

According to an embodiment, the metal nanoparticles, the lithium titanium oxide particles, the carbonaceous material, the binder, and the conductive material, which are included in the negative active material composition, are the same as described above.

According to an embodiment, the lithium titanium oxide particles included in the negative active material composition may include a compound represented by Formula 2 below:

$$Li_xTi_yO_2 \qquad \text{<Formula 2>}$$

wherein $2.4 \leq x \leq 4.2$, and $4.8 < y \leq 6.6$.

For example, the compound represented by Formula 2 may be $Li_4Ti_5O_{12}$.

The solvent may be, for example, N-methylpyrrolidone (NMP), acetone, or water. An amount of the solvent may be, based on 100 parts by weight of the positive active material, in a range of about 1 to about 40 parts by weight. Maintaining the amount of the solvent is within these ranges may help easily form an active material layer.

Then, the positive electrode may be prepared in the same manner as described in connection with the negative electrode, except that a positive active material may be used instead of the negative active material. Also, a binder, a conductive material, and a solvent which may be used in a positive electrode active material composition may be the same as those in the negative electrode.

For example, a positive active material, a binder, and optionally, a conductive material may be dispersed in a solvent to prepare the positive active material composition. Thereafter, the positive active material composition may be directly coated on a current collector, or the positive active material composition may be cast on a separate support, and then, a positive active material film exfoliated from the support may be laminated on a current collector to form a positive active material layer form on at least a surface of the current collector. Then, the current collector with the positive active material layer formed thereon may be dried and pressed to prepare a positive electrode.

The positive active material may be any one of various materials used as a positive active material. The positive active material may include at least one selected from compounds represented by $Li_aA_{1-b}B_bD_2$ (wherein $0.90 \leq a \leq 1$, and $0 \leq b \leq 0.5$); $Li_aE_{1-b}B_bO_{2-c}D_c$ (wherein $0.90 \leq a \leq 1$, $0 \leq b \leq 0.5$, and $0 \leq c \leq 0.05$); $LiE_{2-b}B_bO_{4-c}D_c$ (wherein $0 \leq b \leq 0.5$, and $0 \leq c \leq 0.05$); $Li_aNi_{1-b-c}Co_bB_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_\alpha$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0.001 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 < f \leq 2$); $Li_{(3-f)}Fe_2(PO_4)_3$ ($0 \leq f \leq 2$); and $LiFePO_4$.

In the formulae above, the letters A, B, D, E, F, G, Q, I, and J are used as variables to represent elements as further defined. In particular, A is nickel (Ni), cobalt (Co), manganese (Mn), or a combination thereof; B is aluminum (Al), Ni, Co, Mn, chromium (Cr), iron (Fe), Mg, strontium (Sr), vanadium (V), a rare earth metal element, or a combination thereof; D is oxygen (O), fluorine (F), sulfur (S), phosphorus (P), or a combination thereof; E is Co, Mn, or a combination thereof; F is F, S, P, or a combination thereof; G is Al, Cr, Mn, Fe, Mg, lanthanum (La), cerium (Ce), Sr, V, or a combination thereof; Q is Ti, molybdenum (Mo), Mn, or a combination thereof; I is Cr, V, Fe, Sc, Y, or a combination thereof; and J is V, Cr, Mn, Co, Ni, Cu, or a combination thereof.

For example, the positive active material may include a compound represented by $LiCoO_2$, $LiMn_xO_{2x}$ ($x=1, 2$), $LiNi_{1-x}Mn_xO_{2x}$ ($0<x<1$), $LiNi_{1-x-y}Co_xMn_yO_2$ ($0 \leq x \leq 0.5$, $0 \leq y \leq 0.5$), or $FePO_4$.

Then, a separator which may be intercalated between the positive electrode and the negative electrode may be prepared. The separator may be any one of various materials used in a lithium battery. A material for forming the separator may be, for example, a material that has low resistance to ion migration of an electrolyte and has excellent electrolytic solution retaining capability. For example, the separator forming material may be selected from glass fiber, polyester, Teflon, polyethylene, polypropylene, polytetrafluoroethylene, and a combination thereof, each of which may be in a non-woven fabric or woven fabric form. In general, the separator may have a pore diameter of about 0.01 μm to about 10 μm, and a thickness of about 5 μm to about 300 μm.

The electrolyte may include a non-aqueous electrolyte and a lithium salt. Examples of the non-aqueous electrolyte are a non-aqueous electrolytic solution, an organic solid electrolyte, and an inorganic solid electrolyte.

The non-aqueous electrolytic solution may be, for example, an aprotic solvent, such as N-methyl-2-pyrrolidinone, propylene carbonate (PC), ethylene carbonate (EC), butylene carbonate, dimethyl carbonate (DMC), diethyl carbonate (DEC), ethylmethyl carbonate (EMC), gamma-butyrolactone (GBL), 1,2-dimethoxyethane (DME), tetrahydrofurane (THF), 2-methyl tetrahydrofurane, dimethylsulfoxide (DMSO), 1,3-dioxolane (DOL), formamide, dimethylformamide, acetonitrile, nitromethane, methyl formate, methyl acetate, trimester phosphate, trimethoxy methane, a dioxorane derivative, sulfolane, methyl sulfolane, 1,3-dimethyl-2-imidazolidinone, a propylene carbonate derivative, a tetrahydrofurane derivative, ether, methyl propionate, or ethyl propionate.

The organic solid electrolyte may be, for example, a polyethylene derivative, a polyethylene oxide derivative, a polypropylene oxide derivative, ester phosphate polymer, poly agitation lysine, polyester sulfide, polyvinyl alcohol, polyvinylidene fluoride, or a polymer containing an ionic dissociating agent.

The inorganic solid electrolyte may be, for example, a nitride, halogate, or sulfate of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may be any one of various materials used in a lithium battery. As a material that may be easily dissolved in the non-aqueous electrolyte, for example, at least one selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, 4 phenyl lithium borate, or imide may be used.

Also, the electrolytic solution may include, for example, vinylene carbonate (VC) or catechol carbonate (CC), to form a SEI (solid electrolyte interphase) layer on the surface of the negative electrode and maintain the SEI layer. Optionally, the electrolyte may include a redox-shuttle type additive, such as n-butylferrocene, halogen substituted benzene, to prevent over-charging. Optionally, the electrolyte may include cyclohexylbenzene or biphenyl as an additive for the formation of a film. Optionally, the electrolyte may include a cation receptor, such as a crown ether-based compound, and an anion receptor, such as a boron-based compound, to improve conductive characteristics. Optionally, the electrolyte may include as a retardant a phosphate-based compound, such as trimethyl phosphate (TMP), tris(2,2,2-trifluoroethyl) phosphate (TFP), or hexamethoxycyclotriphosphazene (HMTP).

In some embodiments, to aid the formation of a stabilized SEI layer or a film on the surface of an electrode to improve stability of a lithium battery, the electrolyte may further include, as an additive, for example, tris(trimethylsilyl) phosphate (TMSPa), lithium difluorooxalatoborate (LiFOB), propansultone (PS), succitonitrile (SN), or LiBF$_4$. For example, the electrolyte may include a silane compound and a silazane compound, such as hexamethyldisilazane, which are a compound having a functional group that may form a siloxane bond with acryl, amino, epoxy, methoxy, ethoxy, or vinyl. For example, the electrolyte may include propansultone (PS), succinonitrile (SN), or LiBF$_4$.

For example, a lithium salt, such as LiPF$_6$, LiClO$_4$, LiBF$_4$, or LiN(SO$_2$CF$_3$)$_2$ may be added to a mixed solvent including a cyclic carbonate, such as ethylene carbonate (EC) or propylene carbonate (PC) that is a high-k solvent and a linear carbonate, such as DEC, DMC, or EMC, that is a low-viscosity solvent to prepare an electrolyte.

Then, a formation process may be performed on the lithium battery assembly to complete manufacturing of a lithium battery.

The formation process may stabilize the structure of a battery such that the lithium battery assembly is ready for use. For example, the formation process may include, for example, an aging process, a charging process, or a discharging process of the lithium battery assembly.

The aging process may be a process of immersing a lithium battery assembly in an electrolytic solution.

The charging process may be a process of completely charging a battery to form a SEI layer on the surface of a negative electrode. In the charging process, lithium ions may be intercalated into the metal nanoparticles and the lithium titanium oxide particles.

For example, during the charging process, in the lithium titanium oxide particles, lithium ions may intercalate into the compound represented by Formula 2. For example, lithium ions may be intercalated into the compound represented by Formula 2 that constitutes the lithium titanium oxide particles, and the compound of Formula 2 may change into a compound represented by Formula 1 below:

$$Li_{x+3}Ti_yO_{12} \qquad \text{<Formula 1>}$$

wherein 2.4≤x≤4.2, and 4.8<y≤6.6.

The discharging process may be a process for discharging a battery that has been charged in the charging process, and for the product shipping, a recharging process may be performed.

The discharging process may be performed at discharge cut-off voltage of 1.5 V or less, For example, the discharging process is performed at discharge cut-off voltage of 1 about 0.2 V to about 1.5 V.

During the discharging process, at a voltage of 1.5 V or less, the compound represented by Formula 2 may retain a form intercalated with lithium ions. For example, the compound represented by Formula 2 may maintain its changed form with lithium ions intercalated thereinto, e.g., the form of the compound represented by Formula 1.

During the discharging process, at a voltage of 1.5 V or less, the lithium titanium oxide particles may include the compound represented by Formula 1.

The discharging process may be performed at discharge cut-off voltage of 1.5 V or less, and metal nanoparticles included in the negative electrode of the lithium battery assembly may deintercalate lithium ions. However, lithium titanium oxide particles included in the negative electrode of the lithium battery assembly, at the voltage of 1.5 V or less, may not deintercalate lithium ions. At the voltage of 1.5 V or less, lithium titanium oxide particles included in the negative electrode may not be discharged, and may maintain a charged state.

After the formation process, the lithium titanium oxide particles, which may act as an active material, may change into an inactive material that do not intercalate or deintercalate lithium ions. The lithium titanium oxide particles 22 may continuously retain, after the initial charging, lithium ions intercalated thereinto. The porous matrix including the lithium titanium oxide particles 22 may effectively suppress volumetric expansion of the metal nanoparticles 24 while not involving chemical reactions of a battery.

A method of using a lithium battery according to an embodiment includes discharging the lithium battery at a voltage of 1.5 or less.

Since the lithium battery is not discharged to the voltage of more than 1.5 V, the deintercalation of lithium ions from lithium titanium oxide particles included in the negative electrode of a lithium battery may be prevented.

Figure 2:
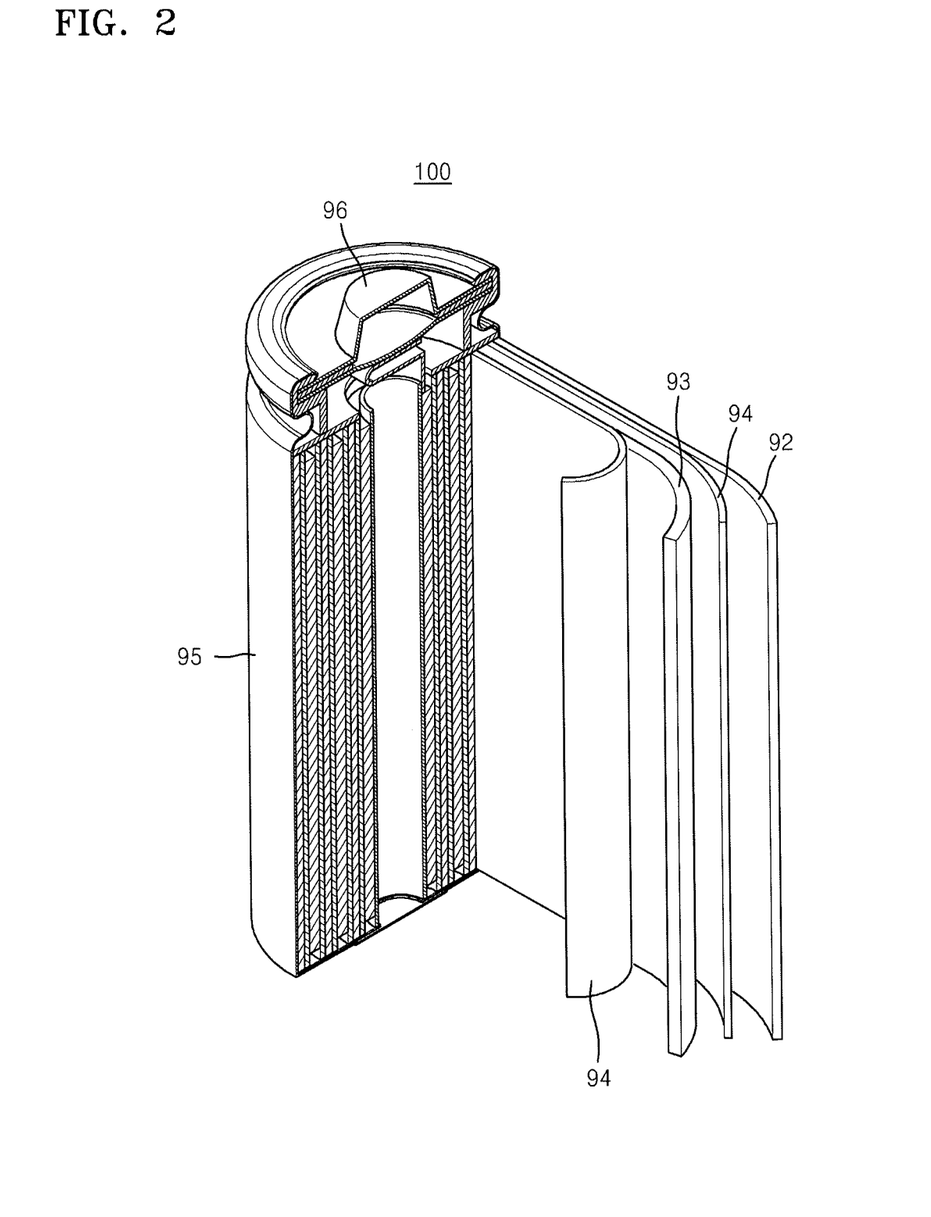
FIG. 2 illustrates a schematic view of a lithium battery according to an embodiment.

FIG. 2 illustrates a schematic view of a lithium battery 100 according to an embodiment.

Referring to FIG. 2, the lithium battery 100 may include a positive electrode 93, a negative electrode 92, and a separator 94 disposed between the positive electrode 93 and the negative electrode 92. Also, to prevent interior short-circuit, the separator 94 may be further disposed outside the positive electrode 93 or the negative electrode 92. The positive electrode 93, the negative electrode 92, and the separator 94 may be wound or folded before being placed in a battery case 95. Subsequently, an electrolyte may be supplied to the battery container 95, which may then be sealed with a sealing member 96 to complete manufacturing of a lithium battery 100. The battery container 95 may be cylindrical, rectangular, or thin-film shaped. The lithium battery 100 may be a lithium ion battery.

The lithium battery may be a winding type electrode or a stack type electrode, which are distinguishable from each other according to the shape of an electrode, and may be cylindrical, rectangular, coin-type, or pouch-type, which are distinguishable from each other according to a cladding design.

The lithium battery may be used as a power source of small-size devices. In some embodiments, the lithium battery may be used as a unit battery of a battery module including a plurality of batteries of a middle- or large-size device.

Examples of the middle- or large-size device include a power tool; xEV, such as an electric vehicle (EV), a hybrid electric vehicle (HEV), or a plug-in hybrid electric vehicle (PHEV); an electric bicycle, such as an E-bike or an E-scooter; an electric golf cart; an electric truck; a commercially available electric car; and a power storage system. The lithium battery may be used in other applications requiring high power output, high voltage, and high-temperature driving.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation of Negative Electrode

Example 1

Si particles (manufactured by Sigma Aldrich Co., Ltd.) having an average particle diameter of 15 nm, $Li_4Ti_5O_{12}$ (manufactured by Samsung Fine Chemicals Co., Ltd.) particles having an average particle diameter of 150 nm, and polyacrylonitrile (PAN), which acted as a binder, were mixed at a weight ratio of 13.3:81.7:5, and to adjust viscosity of the resulting solution, N-methylpyrrolidone, which acted as a solvent, was added thereto in such an amount that a solid content was 60 wt % to prepare a negative active material composition.

The negative active material composition was coated on a copper current collector having a thickness of 15 μm to obtain a thickness of about 40 μm. The current collector with the negative active material composition coated thereon was dried at room temperature, and then, dried at room temperature, and then dried at a temperature of 120° C., followed by pressing and punching to complete the manufacturing of a negative electrode for use in a coin cell.

Example 2

A negative electrode was manufactured in the same manner as in Example 1, except that $Li_4Ti_5O_{12}$ having an average particle diameter of 100 nm was used.

Example 3

A negative electrode was manufactured in the same manner as in Example 1, except that $Li_4Ti_5O_{12}$ having an average particle diameter of 200 nm was used.

Example 4

A negative electrode was manufactured in the same manner as in Example 1, except that $Li_4Ti_5O_{12}$ having an average particle diameter of 300 nm was used.

Example 5

A negative electrode was manufactured in the same manner as in Example 1, except that $Li_4Ti_5O_{12}$ having an average particle diameter of 700 nm was used.

Example 6

A negative electrode was manufactured in the same manner as in Example 1, except that $Li_4Ti_5O_{12}$ having an average particle diameter of 1 μm was used.

Comparative Example 1

A negative electrode was manufactured in the same manner as in Example 1, except that graphite (manufactured by Mitsubishi Co., Ltd) particles having an average particle diameter of 18 μm was used instead of $Li_4Ti_5O_{12}$.

Comparative Example 2

A negative electrode was manufactured in the same manner as in Example 1, except that $Li_4Ti_5O_{12}$ having an average particle diameter of 15 nm was used.

Comparative Example 3

A negative electrode was manufactured in the same manner as in Example 1, except that Si particles having an average particle diameter of 45 nm and $Li_4Ti_5O_{12}$ having an average particle diameter of 15 nm were used.

Evaluation Example 1

Figure 3:
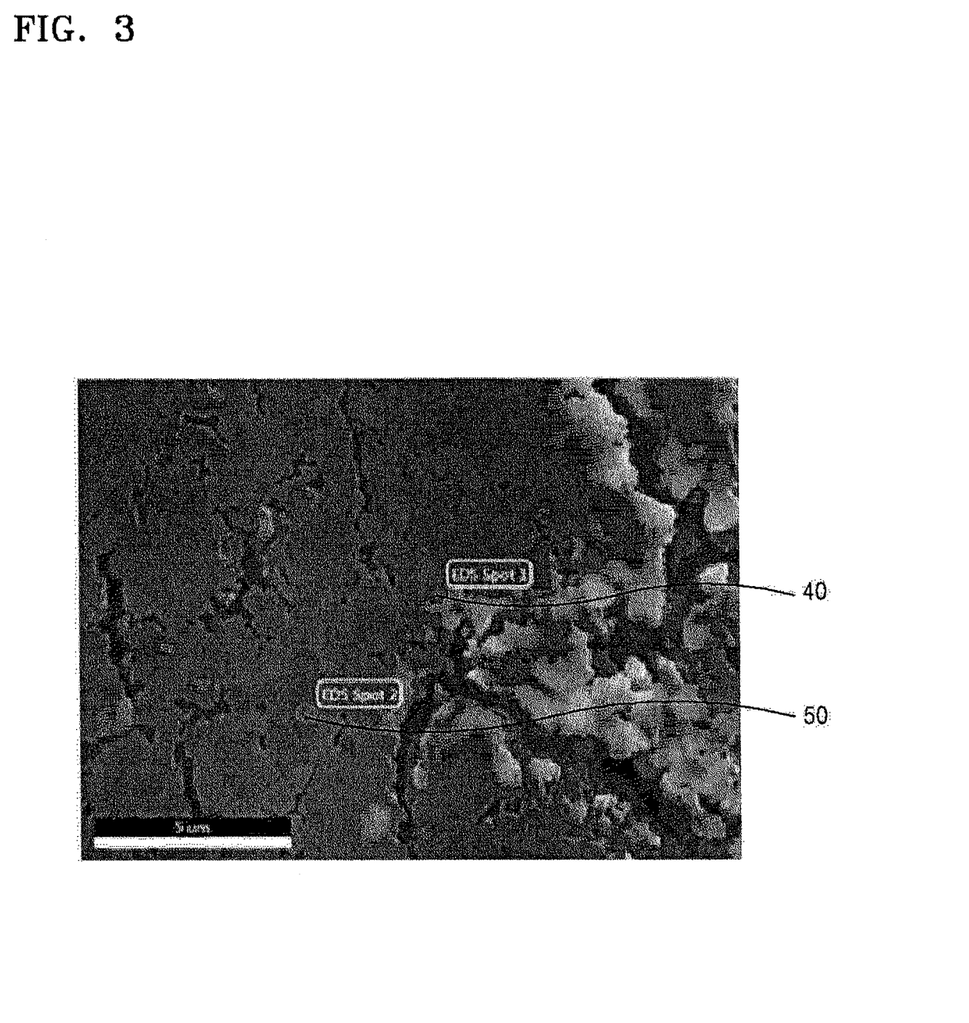
FIG. 3 illustrates a scanning electron microscopy (SEM) image of a negative active material layer manufactured according to Example 1, measured at a magnification of 20,000.

Surface Analysis-Scanning Electron Microscopy (SEM) and X-Ray Spectroscopy (EDS) Measurement of Negative Active Material Layer FIG. 3 illustrates a SEM image of the negative active material layer prepared according to Example 1, measured at a magnification of 20,000.

Figure 4:
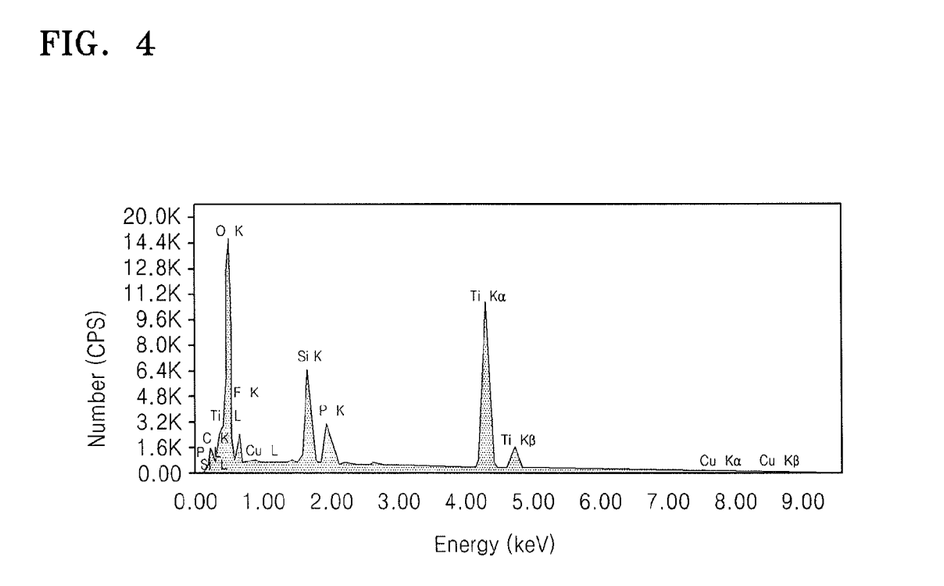
FIG. 4 illustrates energy dispersive X-ray spectroscopy (EDS) results of Spot 1 in the negative active material layer manufactured according to Example 1.
Figure 5:
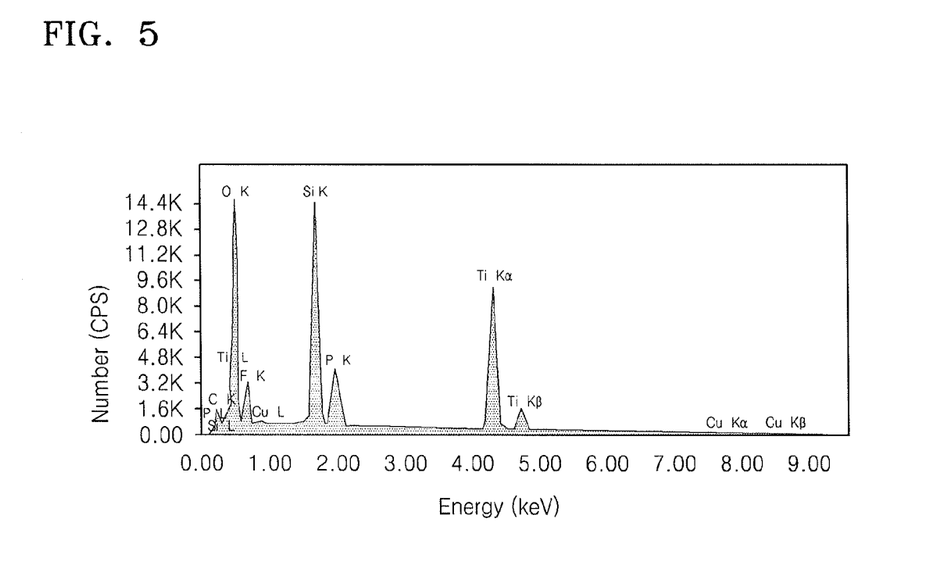
FIG. 5 illustrates EDS results of Spot 2 in the negative active material layer manufactured according to Example 1.

Also, to evaluate a portion of the negative active material layer including $Li_4Ti_5O_{12}$ particles and a portion of the negative active material layer including Si particles, X-ray spectroscopy analysis was performed on Spot 1 and Spot 2 in the negative active material layer (identified by reference characters 40 and 50 in FIG. 3). Results of Spot 1 are shown in FIG. 4 and Table 1, and results of Spot 1 are shown in FIG. 5 and Table 2.

TABLE 1

| Element | wt % | at % (atomic percent) |
|---|---|---|
| C | 6.89 | 12.04 |
| O | 44.5 | 58.38 |
| F | 9.03 | 9.98 |
| Si | 5.12 | 3.83 |
| P | 3.14 | 2.13 |
| Ti | 30.58 | 13.4 |
| Cu | 0.74 | 0.24 |

TABLE 2

| Element | wt % | at % (atomic percent) |
|---|---|---|
| C | 8.17 | 14.21 |
| O | 40.48 | 52.84 |
| F | 9.34 | 10.27 |
| Si | 11.22 | 8.35 |
| P | 4.32 | 2.91 |
| Ti | 25.36 | 11.06 |
| Cu | 1.1 | 0.36 |

As shown in FIGS. 4 and 5 and Tables 1 and 2, it was confirmed that Spot 1 40 has a higher Ti content and a lower Si content than Spot 2 50. In the negative active material layer, Spot 1 40, which is relatively bright, is considered as the portion including $Li_4Ti_5O_{12}$ particles, and Spot 2 50, which is relatively dark, is considered as the portion including Si particles. In FIG. 3, the darker part is mostly surrounded by the bright part, which indicates that Si particles are surrounded by $Li_4Ti_5O_{12}$ particles having a matrix form.

Preparation of Lithium Secondary Batteries—Coin Half Cells

Example 7

A 2032-standard lithium battery assembly was manufactured using the negative electrode manufactured according to Example 1, an opposite electrode formed of a lithium metal, a polypropylene separator having a thickness of 14 μm, and an electrolyte. The electrolyte was prepared by dissolving $LiPF_6$ in a mixed solvent (a volume ratio of EC:DEC:FEC was 5:70:25) including ethylene carbonate (EC), diethyl carbonate (DEC) and fluoroethylene carbonate (FEC) in such a way that the concentration of $LiPF_6$ was 1.10 M.

The lithium battery assembly was initially charged at a 0.1 C rate for 10 minutes, and then, stored at a temperature of 25° C. for one day.

Thereafter, the lithium battery assembly was charged at a 0.1 C rate to a voltage of 4.2 V in a constant current (CC) mode. Subsequently, the lithium battery assembly was discharged at a 0.1 C rate to a discharge cut-off voltage of 1.5 V in a CC mode to complete manufacturing of a lithium secondary battery. (Formation process)

Examples 8 to 12

Lithium secondary batteries were manufactured in the same manner as in Example 7, except that the negative electrodes manufactured according to Examples 2 to 6 were used.

Comparative Examples 4 to 6

Lithium secondary batteries were manufactured in the same manner as in Example 7, except that the negative electrodes manufactured according to Comparative Examples 1 to 3 were used.

Comparative Example 7

A lithium secondary battery was manufactured in the same manner as in Example 7, except that in the formation process, the discharging of the lithium battery was performed to the discharge cut-off voltage of 2.0 V.

Evaluation Example 2

Evaluation of Volumetric Expansion Rate of Battery

The negative electrodes of the lithium secondary batteries manufactured according to Examples 7-12 and Comparative Examples 4-6 were charged at a 0.05 C rate (Formation), and then, the lithium secondary batteries were disassembled to identify the change in a thickness of a negative electrode plate before and after the charging to measure a volumetric expansion rate. Some of the obtained results are shown in Table 3 and FIG. 6.

TABLE 3

| | $Li_4Ti_5O_{12}$ Average particle diameter (nm) | Si Average particle diameter (nm) | $Li_4Ti_5O_{12}$/Si Average particle diameter ratio | Volumetric expansion rate (%) |
|---|---|---|---|---|
| Example 7 | 150 | 15 | 10 | 46 |
| Example 8 | 100 | 15 | 6.67 | 70 |
| Example 9 | 200 | 15 | 13.33 | 50 |
| Example 11 | 700 | 15 | 46.67 | 40 |
| Example 12 | 1000 | 15 | 66.67 | 30 |
| Comparative Example 4 | — | 15 | — | 58 |
| Comparative Example 5 | 15 | 15 | 1 | 58 |
| Comparative Example 6 | 15 | 45 | 0.33 | 58 |

Figure 6:
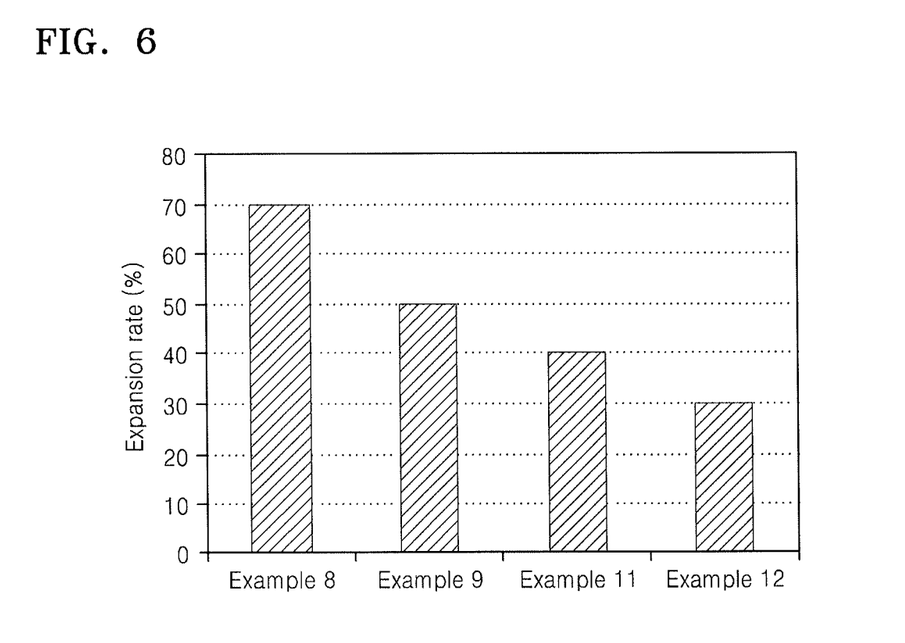
FIG. 6 illustrates a graph of a volumetric expansion rate of lithium batteries manufactured according to Examples 8, 9, 11 and 12.

As shown in Table 3 and FIG. 6, when an average particle diameter of $Li_4Ti_5O_{12}$ was greater than an average particle diameter of Si, compared to a case in which $Li_4Ti_5O_{12}$ was not used, a volumetric expansion rate of a negative electrode decreased. When the average particle diameter of $Li_4Ti_5O_{12}$ was equal to or smaller than the average particle diameter of Si, compared to a case in which $Li_4Ti_5O_{12}$ was not used, the volumetric expansion rate did not decrease. In the case of the lithium secondary batteries manufactured according to Examples 7 and 9-12, due to the matrix structure including $Li_4Ti_5O_{12}$, volumetric expansion of Si during charging and discharging was suppressed.

Also, when the difference between the average particle diameter of $Li_4Ti_5O_{12}$ and the average particle diameter of Si increased, the volumetric expansion rate of a negative electrode decreased. Without wishing to be bound by any theories, it is believed that the decrease in the volumetric expansion rate was due to the fact that the increase in the average particle diameter of $Li_4Ti_5O_{12}$ resulted in a greater pore size inside the matrix, leading to a decrease in the number of Si particles that were not surrounded by $Li_4Ti_5O_{12}$.

Evaluation Example 3

Rate Characteristics Evaluation

The lithium secondary batteries manufactured according to Example 7 and Comparative Example 4 was charged at a 0.01 C rate to a maximum operating voltage in a CC mode, and then discharged at a 0.2 C rate to a discharge cut-off voltage of 1.5 V in a CC mode. Then, the capacity retention ratio with respect to a C-rate of the lithium secondary batteries was measured while the lithium secondary batteries was discharged at a 0.5 C, 1.0 C, 2.0 C, 3.0 C and 5.0 C, respectively. The results are shown in FIG. 7.

Figure 7:
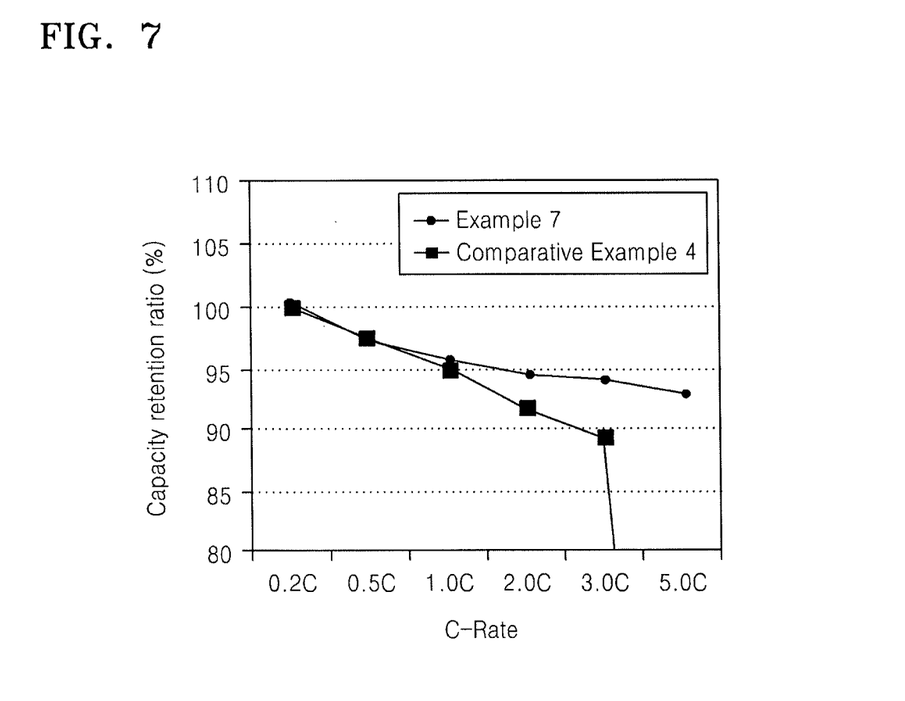
FIG. 7 illustrates a graph of a capacity retention ratio with respect to a C-rate of lithium batteries manufactured according to Example 7 and Comparative Example 4.

Referring to FIG. 7, in the case of the lithium secondary battery manufactured according to Comparative Example 4, it was impossible to measure the capacity retention ratio when the C-rate was equal to or greater than 3 C, but in the case of the lithium secondary battery manufactured according to Example 7, even at 5 C, the capacity retention ratio was 90% or more. It was confirmed that a negative electrode including $Li_4Ti_5O_{12}$ having an average particle diameter that is greater than that of Si has better high-rate characteristics than a negative electrode that does not include $Li_4Ti_5O_{12}$ having an average particle diameter that is greater than that of Si. Without wishing to be bound by any theories, it is believed that the difference in high-rate characteristics resulted because, due to relatively large spaces between graphite particles, during charging and discharging, the volumetric expansion of Si was not effectively suppressed.

Evaluation Example 4

Lifespan Characteristics Evaluation

The lithium secondary batteries manufactured according to Examples 9 to 11 and Comparative Examples 4 to 6 were charged at a 0.5 C rate in a CC mode at a temperature of 25° C. to a voltage of 4.3 V, and then, holding the battery at 4.3 V, the lithium secondary batteries were charged in a constant voltage (CV) mode to a 0.05 C rate. Subsequently, discharging was performed at a 1 C rate to the voltage of 1.5 V in a CC mode. A cycle of the charging, the charging, and the discharging was repeatedly performed 50 times.

Figure 8:
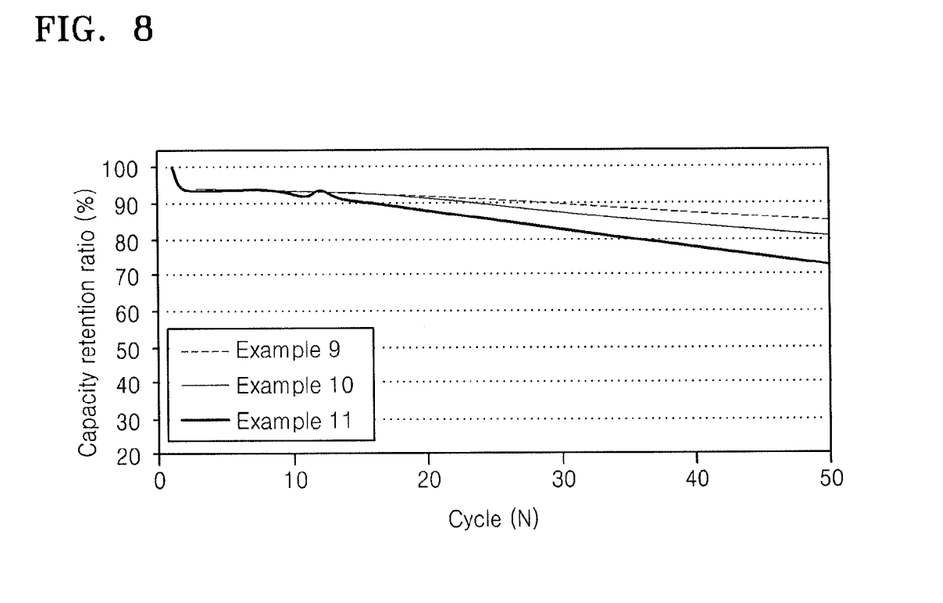
FIG. 8 illustrates a graph of a capacity retention ratio with respect to cycle of lithium batteries manufactured according to Examples 9-11.

A capacity retention ratio (CRR) of the coin half cell was measured and results thereof are shown in Table 4 and FIG. 8. Herein, the capacity retention ratio is defined in Equation 1 below:

Capacity retention ratio [%]=[discharging capacity in each cycle/discharging capacity in $1^{st}$ cycle]× 100      <Equation 1>

TABLE 4

| | $Li_4Ti_5O_{12}$ Average particle diameter (nm) | Si Average particle diameter (nm) | $Li_4Ti_5O_{12}$/Si Average particle diameter ratio | 50 times Capacity retention ratio [%] |
|---|---|---|---|---|
| Example 9 | 200 | 15 | 13.33 | 85 |
| Example 11 | 700 | 15 | 46.67 | 80 |
| Example 12 | 1000 | 15 | 66.67 | 72 |
| Comparative Example 4 | — | 15 | — | 50 |
| Comparative Example 5 | 15 | 15 | 1 | 60 |
| Comparative Example 6 | 15 | 45 | 0.33 | 55 |

Without wishing to be bound by any theories, it is believed that, as shown in Table 4 and FIG. 8, compared to the batteries manufactured according to Comparative Examples, the batteries manufactured according to Examples had a high capacity retention ratio due to the fact that structural stability of a negative electrode was improved by, for example, suppressing volumetric expansion of the negative electrode.

Evaluation Example 5

Impedance Evaluation

Impedance of the batteries manufactured according to Example 7 and Comparative Example 7 was measured using PARSTAT 2273 according to a 2-probe method. Frequency range was in a range of about $10^5$ to about $10^{-1}$ Hz. The Nyquist plot obtained by impedance evaluation is illustrated in FIG. 9.

Figure 9:
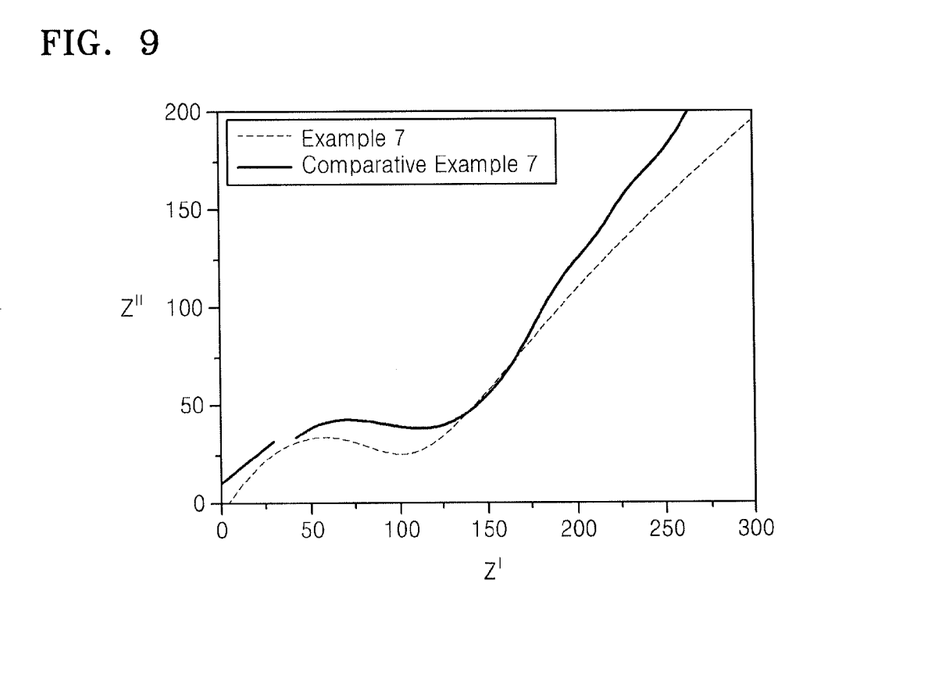
FIG. 9 illustrates impedance measurement results of lithium batteries manufactured according to Example 7 and Comparative Example 7.

As shown in FIG. 9, compared to the lithium battery manufactured according to Comparative Example 7, the lithium battery manufactured according to Example 7 had a small impedance. The small impedance resulted because, when the discharging of the lithium battery assembly is performed at discharge cut-off voltage of 1.5 V, $Li_4Ti_5O_{12}$ exists in the form of $Li_7Ti_5O_{12}$ in which lithium ions are intercalated, and thus, even when charging and discharging are further repeatedly performed, the $Li_7Ti_5O_{12}$ acts as a conductive material without the intercalation or deintercalation of lithium ions.

By way of summation and review, for use as a negative active material in lithium secondary batteries, carbonaceous materials may be used, and examples thereof are crystalline carbon, such as graphite and artificial graphite, and amorphous carbon, such as soft carbon and hard carbon. However, the theoretical capacity of carbonaceous materials is at most 380 mAh/g. Accordingly, carbonaceous materials may not be suitable for use in high-capacity lithium batteries.

To address such issues, research into metal that is alloyable with lithium, such as silicon, tin, albumin, germanium, or lead, and alloys and composites thereof is being actively performed. Negative active materials using such non-carbonaceous materials may allow more lithium ions to be intercalated thereinto or deintercalated from than negative active materials using carbonaceous materials, and negative active materials using such non-carbonaceous materials can be used for the manufacture of high-capacity and high-energy density batteries. For example, pure silicon has a theoretical capacity as high as 4,200 mAh/g.

However, in the case of inorganic materials, such as silicon or tin, used as a negative active material, lithium ions may be intercalated thereto by charging, the inorganic materials may swell by about 300% to about 400%, lithium ions may be deintercalated therefrom by discharging, and the inorganic particles may shrink. Due to the volumetric change during charging and discharging, a negative active material may be exfoliated from a negative electrode collector, and capacity and lifespan of a battery may decrease.

In general, to suppress volumetric expansion of a negative active material that may occur due to repeated charging and discharging, the size of metal particles that are alloyable with lithium may reduced, multi-phase alloys may be used, or a composite of an alloy and metal may be used. However, these methods are limited in their ability to suppress volumetric expansion, or result in high manufacturing costs.

However, according to embodiments, a particle diameter ratio of lithium titanium oxide particles to metal nanoparticles may be controlled such that the metal nanoparticles may be dispersed in pores inside a porous matrix including the lithium titanium oxide particles. By doing so, volumetric expansion of a negative electrode is suppressed and lifespan characteristics of a battery may be improved.

One or more embodiments include a lithium battery with improved lifespan characteristics including the negative electrode. One or more embodiments include a method of manufacturing the lithium battery. One or more embodiments include a method of using the lithium battery.

A negative electrode according to an embodiment may include a current collector and a negative active material layer disposed on at least a surface of the current collector, and the negative active material layer may include a porous matrix including lithium titanium oxide particles, and metal nanoparticles that are alloyable with lithium. The lithium titanium oxide particles may have an average diameter that is at least two times greater than that of the metal nanoparticles, and during charging and discharging of a lithium battery, the lithium titanium oxide particles may act as a body that suppresses volumetric expansion of the metal nanoparticles. The lithium titanium oxide particles may also act as a conductive material, compensating for electric conductivity of the metal nanoparticles. Structural stability of the negative electrode and lifespan characteristics of a lithium battery including the negative electrode may improve.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative electrode for a lithium battery, the negative electrode comprising:
    a current collector; and
    a negative active material layer on at least a surface of the current collector;
    the negative active material layer including a porous matrix including lithium titanium oxide particles and metal nanoparticles that are alloyable with lithium, and
    an average particle diameter of the lithium titanium oxide particles being at least two times greater than an average particle diameter of the metal nanoparticles.

2. The negative electrode as claimed in claim 1, wherein the average particle diameter of the lithium titanium oxide particles is 5 to 50 times greater than the average particle diameter of the metal nanoparticles.

3. The negative electrode as claimed in claim 1, wherein the metal nanoparticles are located among the lithium titanium oxide particles.

4. The negative electrode as claimed in claim 1, wherein the average particle diameter of the lithium titanium oxide particles is in a range of about 100 nm to about 1 μm.

5. The negative electrode as claimed in claim 1, wherein the lithium titanium oxide particles include a compound represented by Formula 1:

$Li_{x+3}Ti_yO_{12}$ <Formula 1> wherein 2.4≤x≤4.2, and 4.8<y≤6.6.

6. The negative electrode as claimed in claim 1, wherein an amount of the lithium titanium oxide particles is 3 to 10 times greater than that of the metal nanoparticles by weight.

7. The negative electrode as claimed in claim 1, wherein the average particle diameter of the metal nanoparticles is in a range of about 10 nm to about 500 nm.

8. The negative electrode as claimed in claim 1, wherein the metal nanoparticles include one or more selected from Si, Sn, Al, Ge, Pb, Bi, Sb, and an alloy or oxide thereof.

9. The negative electrode as claimed in claim 1, wherein the metal nanoparticles include Si or $SiO_x$ (0<x<2).

10. The negative electrode as claimed in claim 1, wherein the metal nanoparticles include metal particles coated with a carbonaceous coating layer.

11. The negative electrode as claimed in claim 1, wherein an amount of the metal nanoparticles is in a range of about 0.1 wt % to about 50 wt % based on the total weight of the negative active material layer.

12. The negative electrode as claimed in claim 1, wherein the lithium titanium oxide particles do not deintercalate lithium ions during charging and discharging of a lithium battery.

13. The negative electrode as claimed in claim 1, wherein the lithium titanium oxide particles have electric conductivity.

14. The negative electrode as claimed in claim 1, wherein the negative active material layer further includes a conductive material.

15. A lithium battery comprising the negative electrode as claimed in claim 1.

16. A method of manufacturing a lithium battery, the method comprising:
    providing a lithium battery assembly including a positive electrode, a negative electrode, a separator disposed between the positive electrode and the negative electrode, and an electrolyte, wherein providing the lithium battery assembly includes:
        preparing a negative active material composition including metal nanoparticles and lithium titanium oxide particles; and
        coating a current collector with the negative active material composition to manufacture a negative electrode including a negative active material layer formed on the current collector; and
    charging and discharging the lithium battery assembly, wherein discharging the lithium battery assembly is performed at 1.5 V or less.

17. The method as claimed in claim 16, wherein the lithium titanium oxide particles of the negative active material composition include a compound represented by Formula 2:

$Li_xTi_yO_{12}$ <Formula 2> wherein 2.4≤x≤4.2, and 4.8<y≤6.6.

18. The method as claimed in claim 17, wherein during discharging the lithium battery assembly, the lithium titanium oxide particles include a compound represented by Formula 1:

$Li_{x+3}Ti_yO_{12}$ <Formula 1> wherein 2.4≤x≤4.2, and 4.8<y≤6.6.

19. The method as claimed in claim 16, wherein the lithium titanium oxide particles of the lithium battery subjected to the discharging of the lithium battery assembly do not deintercalate lithium ions.

20. A method of using a lithium battery, the method comprising discharging the lithium battery of claim 15 at a voltage of 1.5 V or less.

* * * * *